(12) United States Patent
Lemoff et al.

(10) Patent No.: US 6,198,864 B1
(45) Date of Patent: Mar. 6, 2001

(54) OPTICAL WAVELENGTH DEMULTIPLEXER

(75) Inventors: Brian E. Lemoff, Union City; Lewis B. Aronson, Los Altos, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/199,988

(22) Filed: Nov. 24, 1998

(51) Int. Cl.[7] .................. G02B 6/26; G02B 6/42
(52) U.S. Cl. .................. 385/47; 385/24; 385/37; 359/124; 359/127; 359/130
(58) Field of Search .................. 385/47, 24, 37, 385/50; 359/124, 127, 130

(56) References Cited

U.S. PATENT DOCUMENTS

| 4,422,714 | * | 12/1983 | Benoit | 385/47 |
| 4,675,860 | | 6/1987 | Laude et al. | 370/3 |
| 4,723,829 | | 2/1988 | Koonen | 350/96.19 |
| 4,744,618 | * | 5/1988 | Mahlein | 385/37 |
| 5,436,871 | * | 7/1995 | Russell | 365/234 |
| 5,808,763 | | 9/1998 | Duck et al. | 359/127 |
| 5,835,517 | * | 11/1998 | Jayaraman | 372/50 |

FOREIGN PATENT DOCUMENTS

5528029A * 2/1980 (JP).

* cited by examiner

Primary Examiner—Thong Nguyen
Assistant Examiner—Leo Boutsikaris

(57) ABSTRACT

A demultiplexer includes a unitary optically transparent structure that utilizes focusing relay mirrors to relay a multi-wavelength beam of light among a series of wavelength-specific interference filters, with each filter separating out a specific wavelength component from the multi-wavelength beam. The relay mirrors are focusing mirrors, so that the demultiplexer can be operated with a non-collimated light beam in a manner that controls the potentially large angle of divergence of non-collimated light, while taking advantage of the small beam diameter in order to create a demultiplexer with greater miniaturization.

20 Claims, 3 Drawing Sheets

OPTICAL WAVELENGTH DEMULTIPLEXER

TECHNICAL FIELD

The invention relates generally to wavelength division multiplexed optical communication systems and more particularly to an optical wavelength division demultiplexer.

DESCRIPTION OF THE RELATED ART

In a wavelength division multiplexed (WDM) optical system, light from several lasers, each having a different central wavelength, is combined into a single beam that is introduced into an optical fiber. Each wavelength is associated with an independent data signal through the fiber. At the exit end of the fiber, a demultiplexer is used to separate the beam by wavelength into the independent signals. In this way, the data transmission capacity of a fiber is increased by a factor equal to the number of single-wavelength signals combined into a single fiber.

Many examples of prior art optical demultiplexers exist. One example of a bulk optical filter-based demultiplexer is disclosed in U.S. Pat. No. 5,808,763, entitled "Optical Demultiplexer," issued to Duck et al. (hereinafter Duck). The optical demultiplexer of Duck receives collimated light into a glass block and directs the collimated light onto a single interference filter. The single interference filter has a wavelength filtering characteristic that is dependent upon the angle of incidence with which the collimated light impacts the filter. To manipulate the angle of incidence of the collimated light impacting the filter, a series of reflective surfaces are located opposite the filter and are angled such that the collimated light zigzags between the filter and the reflective surfaces within the glass block, reaching the filter each time at a different angle of incidence. The different angles of incidence are predetermined to enable separation of a multi-wavelength beam of light into its wavelength components. Although the demultiplexer of Duck works well for its intended purpose, the beam diameters involved with collimated light place physical constraints on the degree of miniaturization that can be achieved in a demultiplexer of this type. In addition, the reflective surfaces must be precisely angled to achieve light filtration at the desired wavelength.

In another known bulk optical filter-based demultiplexer, a compound objective lens collimates light from an optical fiber and then directs the light onto a succession of wavelength-specific optical filters at a particular angle. At each optical filter, light of one wavelength, or a group of wavelengths, is transmitted while light of the remaining wavelengths is reflected. The transmitted light from each optical filter is refocused by filter-specific compound objective lenses and coupled into outgoing fibers for subsequent use. The light reflected from each optical filter propagates back and forth between successive wavelength-specific optical filters in a zigzag fashion within the body of the demultiplexer. Although the demultiplexer works well for its intended purpose, the demultiplexer requires several discrete objective lenses which must be assembled and precisely aligned with respect to one another. In addition, as with the Duck demultiplexer, the use of collimated light limits the degree of miniaturization that can be achieved in a demultiplexer of this type.

Another example of a prior art demultiplexer is disclosed in U.S. Pat. No. 4,675,860, entitled "Compact Wavelength Multiplexer-Demultiplexer with Variable Filtration," issued to Laude et al. (hereinafter Laude). Laude discloses a demultiplexer that utilizes a number of spherical interference filters that are arranged in series along an optical path of a beam of light that is emitted from an optical fiber. Each filter is selective to a particular wavelength and reflects light of the particular wavelength back to a wavelength-specific output fiber, while the light of other wavelengths is passed onto the next filter in the series. While the demultiplexer works well for its intended purpose, since the filters are located in series along the direction of light propagation, light of a wavelength that is not initially reflected by a first filter will pass through each filter twice. For example, in a three-channel demultiplexer, portions of the original light beam must pass forwardly and rearwardly through two filters. In addition, since the filters refocus the diverging light upon reflection, the curvature of the filters must be precisely formed. Further, because the filters are arranged in a series along the optical path, the filters must be bonded to a device that is formed by combining multiple separately fabricated parts.

In view of the size constraints involved with bulk optical multiplexers and the drawbacks involved with utilizing filters arranged in series along an optical path, what is needed is an optical demultiplexer that can be easily produced with greater miniaturization.

SUMMARY OF THE INVENTION

A demultiplexer in accordance with the invention includes an optically transparent structure that utilizes focusing relay mirrors to relay a multi-wavelength light beam among laterally arranged wavelength-specific interference filters, with each filter separating out a specific wavelength component from the multi-wavelength beam. The relay mirrors are focusing mirrors, so that the demultiplexer can be operated with a non-collimated light beam in a manner that controls the tendency of such a beam to have a large angle of divergence, while taking advantage of the small beam diameter in order to create a demultiplexer with greater miniaturization.

A preferred demultiplexer includes a main optical block, wavelength-specific interference filters coupled to the main optical block, and a series of relay mirrors formed within the main optical block to direct and focus light onto the interference filters. The preferred main optical block of the demultiplexer is composed of a monolithic optically transparent material, such as plastic or glass. Mechanical features at an input end of the main optical block align and register an optical fiber, so that a beam of light from the fiber enters the block through a flat input surface of the block. An objective mirror is integrated into another surface of the main optical block to receive the beam of multi-wavelength optical energy from the input fiber and to direct the beam to the first one of the interference filters. The objective mirror is preferably a convex surface relative to the exterior of the block and is shaped such that light that is incident on the first interference filter has the desired spatial and angular characteristics. The surface segment that forms the objective mirror is preferably coated so as to be internally reflective, however at sufficient angles of incidence, an uncoated mirror with total internal reflection can be used. In an alternative embodiment, an objective lens is integrated into the input surface to focus the incoming beam of light. The focused light is directed from the objective lens to the first filter by a flat mirror that is formed on a surface of the main optical block. In either embodiment, additional internally reflecting surfaces can be implemented to fold the incoming beam from the optical fiber, so that the necessary optical distance between the input fiber and the first interference filter is obtained in a relatively small space.

The main optical block also includes an output end. The output end of the main optical block preferably includes a flat output surface to which the interference filters are attached. In some cases, mechanical features can be integrated into the output end of the main optical block to aid in the alignment and registration of the interference filters.

The interference filters are wavelength-selective filters that are preferably connected to the output end of the MOB in a linear array with fixed center-to-center spacing. Each filter has high transmission and low reflection over a particular range of wavelengths and low transmission and high reflection over another range of wavelengths. The preferable transmission spectrum for WDM demultiplexer applications is a "flat top" shape in which very high and uniform transmission is achieved over one wavelength range, while immediately outside the range a very low transmission and high reflection is achieved. Although the interference filters are preferably separated into discrete pieces, the interference filters can also be integrated onto a single substrate that is attached to the output end of the main optical block. Moreover, the interference filters can be deposited directly onto the output end of the main optical block.

The relay mirrors are focusing mirrors that are preferably integrated into a surface of the main optical block that is parallel to the surface which is in contact with the interference filters. The relay mirrors are located and shaped to produce the desired spatial and angular characteristics of a beam that propagates in a zigzag fashion between the interference filters and the relay mirrors. The relay mirrors are preferably convex aspheric surfaces relative to the exterior of the block and are coated so that they are internally reflective. In situations in which the fiber core and the beam diameter at the filters can be treated as "points," because they are significantly smaller than any other dimension in the optical system, an ellipsoidal objective mirror and ellipsoidal relay mirrors with foci at the input fiber and the filter centers can be utilized to provide more precise imaging.

In an additional aspect of the invention, a lens array is coupled to the output end of the main optical block to direct and focus the filtered light that is output from the main optical block to an adjacent array of detectors. Preferably, the lens array is integrated into a lens array block that is a structure of plastic or glass similar to the main optical block. The lens array block and the main optical block can be made to have complementary mechanical features that enable the two parts to fit together with precise alignment. Additional mechanical features on the lens array block and/or the main optical block can be formed to act as spacers that fix the distance between the lens array and an optical detector array or an array of output optical fibers.

When implemented in a preferred four-channel WDM communications system, light from an optical fiber is coupled directly into the main optical block through the input surface without the light being collimated. The objective mirror integrated into the main optical block focuses and directs the light from the optical fiber to a first of four wavelength-specific interference filters that are formed on the output end of the main optical block. The light propagates from the objective mirror to the first interference filter at a pre-established angle of incidence. The light that is transmitted through the first filter is focused by a lens of the attached lens array onto a detector for signal detection. The light that is not transmitted through the first filter is reflected from the first filter and re-reflected to a second filter by the first relay mirror. The second filter further separates the beam, and the same process is repeated between the second and third, and between the third and fourth wavelength-specific interference filters, using the second and third relay mirrors, respectively. As the light beam is relayed among the four wavelength-specific filters, the components of the light beam have been separated by wavelength and transmitted through the attached lens array to appropriate detectors of the detector array, thereby demultiplexing the WDM signal.

Advantages of the invention include the ability to fabricate the demultiplexer using high volume, low cost techniques, such as injection molding, without the need to rely on specialized materials. In addition, because dielectric interference filters have reflectivities higher than 99% outside of their passband, essentially all of the light of a particular wavelength reaches the appropriate filter, thereby limiting signal loss to the transmission loss of the filter. Because the demultiplexer uses integrated focusing reflectors in a folded geometry, the demultiplexer occupies less space than prior designs while providing the same performance. Further, assembly of the demultiplexer involves attaching the interference filters to the main optical block with only a very coarse alignment.

DETAILED DESCRIPTION

Figure 1:
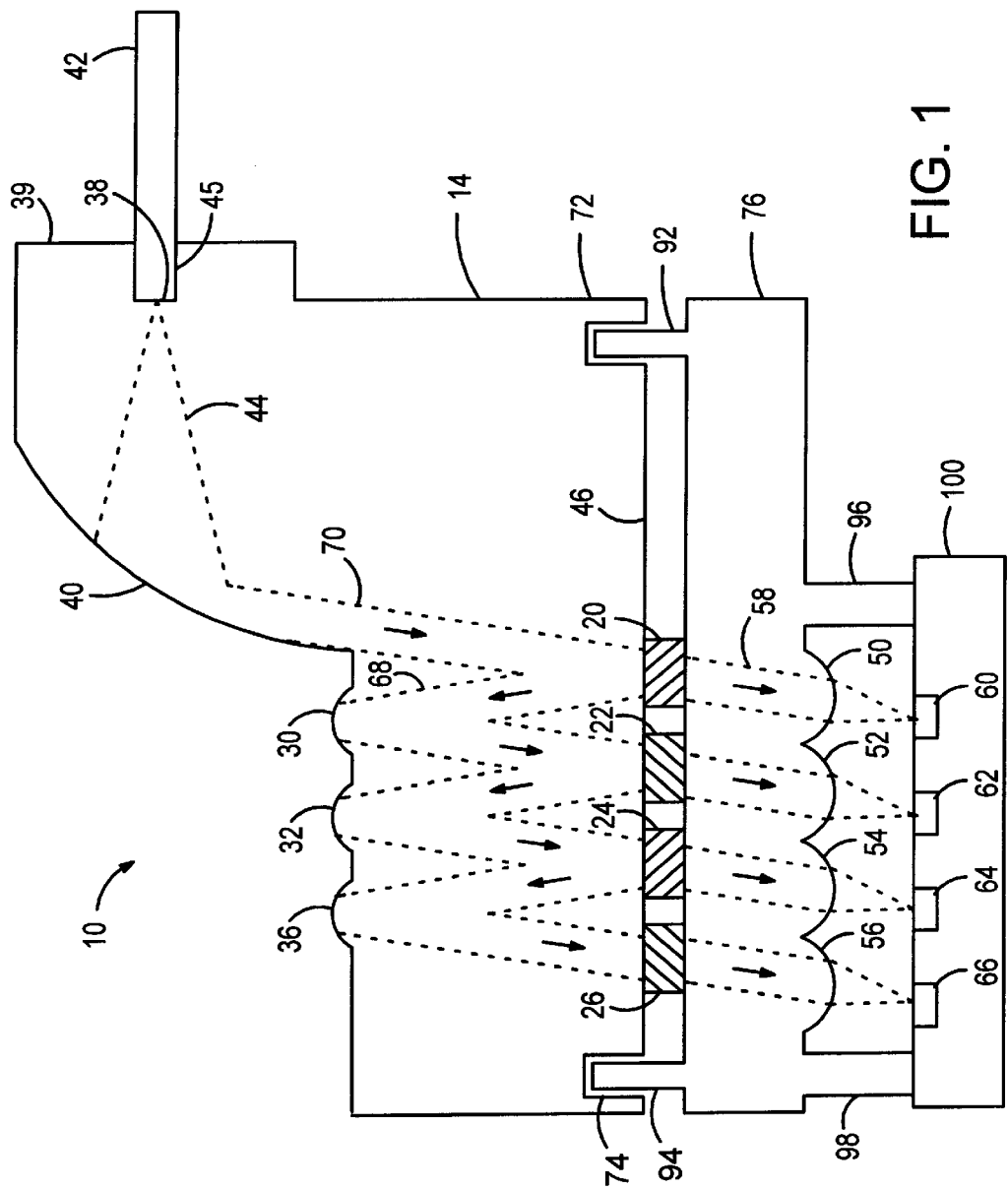
FIG. 1 is a depiction of a four-channel demultiplexer with an objective mirror and separate MOB nd lens array in accordance with the invention.

FIG. 1 is a depiction of a demultiplexer 10 in accordance with a preferred embodiment of the invention. The demultiplexer includes a main optical block 14 (MOB), an input surface 38, an objective mirror 40, wavelength-specific dielectric interference filters 20, 22, 24 and 26 coupled to the MOB, and a series of relay mirrors 30, 32, and 36 integrated into the MOB to direct and focus light between the interference filters. The term "wavelength" is used herein to designate the approximate center wavelength of a wavelength distribution that is typical of an optical signal.

In brief, when implemented in a four-channel WDM communications system, light is coupled from an optical fiber 42 into the MOB through the input surface 38 without the light being collimated. The objective mirror 40 integrated into the MOB receives the input light 44 that is diverging from the input surface and focuses and directs the light 70 to a first filter 20 of the four wavelength-specific interference filters that are attached to an output end 46 of the MOB.

The light beam 58 that is transmitted through the first filter is focused by an adjacent lens 50 onto a detector 60 for signal detection. The light beam portion 68 that is not transmitted through the first filter is reflected by the first filter for impingement upon a second filter 22 via the first internally reflective concave relay mirror 30. The second filter further separates the beam based upon wavelength. The same process is repeated between the second and third 24 and between the third and fourth 26 wavelength-specific filters, using the second 32 and third 36 relay mirrors respectively. By directing the WDM signal to each of the wavelength-specific filters, the WDM signal is separated into its four channels. It is important to note that the relay mirrors are concave mirrors, so that the non-collimated and diverging light beam is continuously refocused while propagating between adjacent filters, allowing the demultiplexer to be extremely small as compared to prior art bulk optical demultiplexers for non-collimated beams. With the basic structure and function of a preferred demultiplexer briefly described, more details of the preferred embodiment and alternative embodiments are described below.

The MOB 14 of FIG. 1 utilizes a flat input surface 38 at the input end 39 of the MOB and an objective mirror 40 at another surface of the MOB to direct the incoming light to the first filter 20. The objective mirror 40 is preferably a convex mirror (relative to the exterior of the MOB) integrated into the surface of the MOB in alignment to receive the multi-wavelength light 44 that is introduced at the input surface. The objective mirror can be coated so as to be internally reflective, or at sufficiently high incident angles an uncoated mirror with totally internal reflection can be used. As can be seen, the multi-wavelength light 44 is diverging as it travels from the input surface 38 to the objective mirror. Ideally, the mirror is configured such that the multi-wavelength light 70 is converging as the light propagates from the objective mirror 40 to the first filter. The input structure of the MOB is designed so that a converging light beam is incident on the first filter 20 at a non-perpendicular angle with respect to the filters 20–26. For each filter, the preferred angle of incidence relative to the output end 46 is approximately 78 degrees.

Mechanical features 45 can be formed in the input end 39 of the MOB 14 for aligning and registering the optical fiber 42. The preferred MOB is composed of a monolithic, homogeneous, and optically transparent material such as plastic or glass. Injection molding is preferably used to fabricate the MOB, but other molding techniques or precision machining techniques can also be used. The dimensions of the preferred MOB as shown in FIG. 1 may be approximately 7 mm high, 5 mm long, and 1.75 mm wide, although the exact dimensions are not critical.

Figure 2:
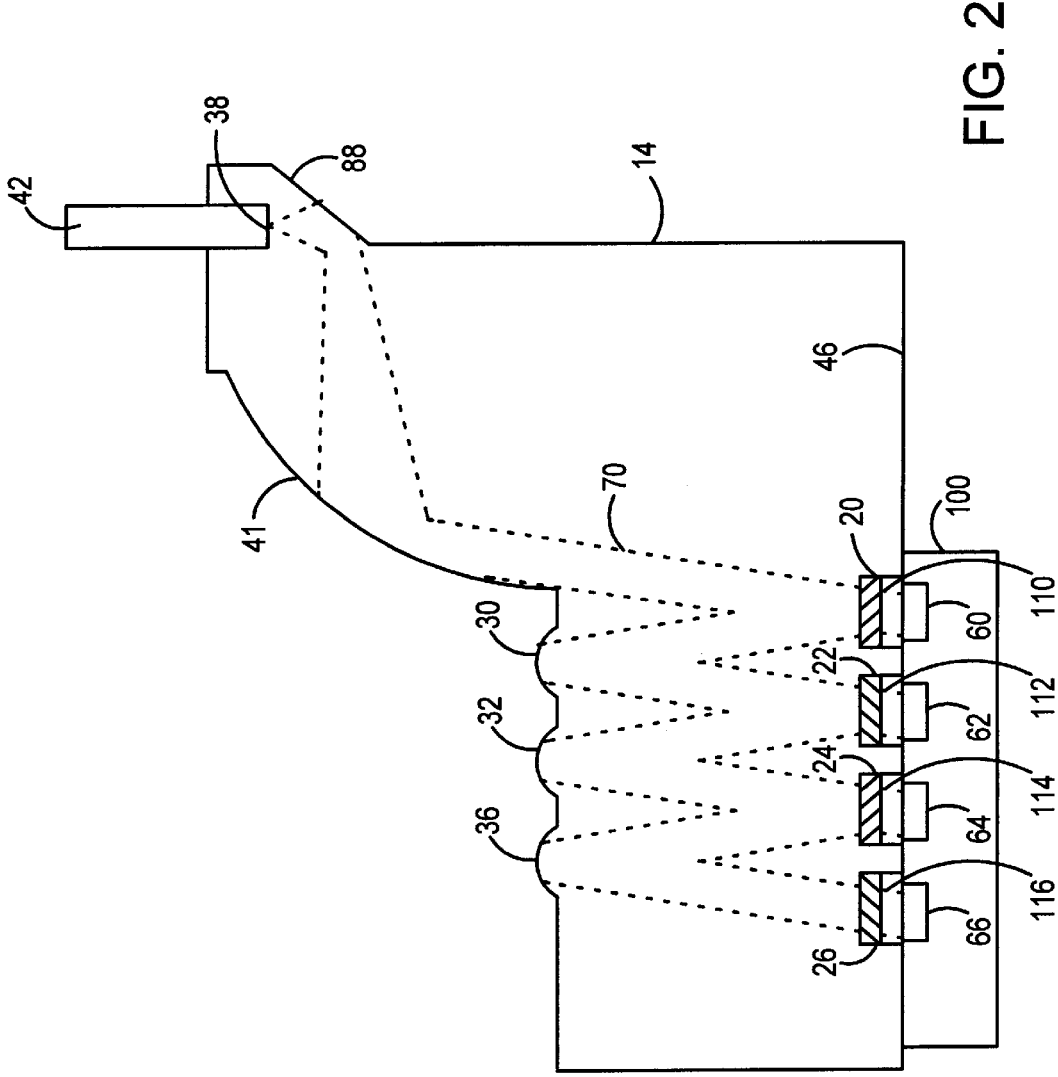
Fig. 2 is a depiction of a four-channel demultiplexer with an objective mirror and direct coupling to detectors in accordance with the invention.

FIG. 2 is an alternative input arrangement in which like elements are numbered as in FIG. 1. In the arrangement of FIG. 2, the input fiber 42 is perpendicular to the output end 46 of the MOB. A flat objective mirror 88 and a convex integrated mirror 41 (concave relative to incident light) are utilized to direct and focus the light from the input surface 38 to the first filter 20. FIG. 2 is one example of a folded geometry that can be implemented, but various other arrangements are possible. For example, additional flat reflective surfaces can be used following the input surface to fold the beam, so that the required optical distance between the objective and the first filter can be obtained in a relatively small space.

Figure 3:
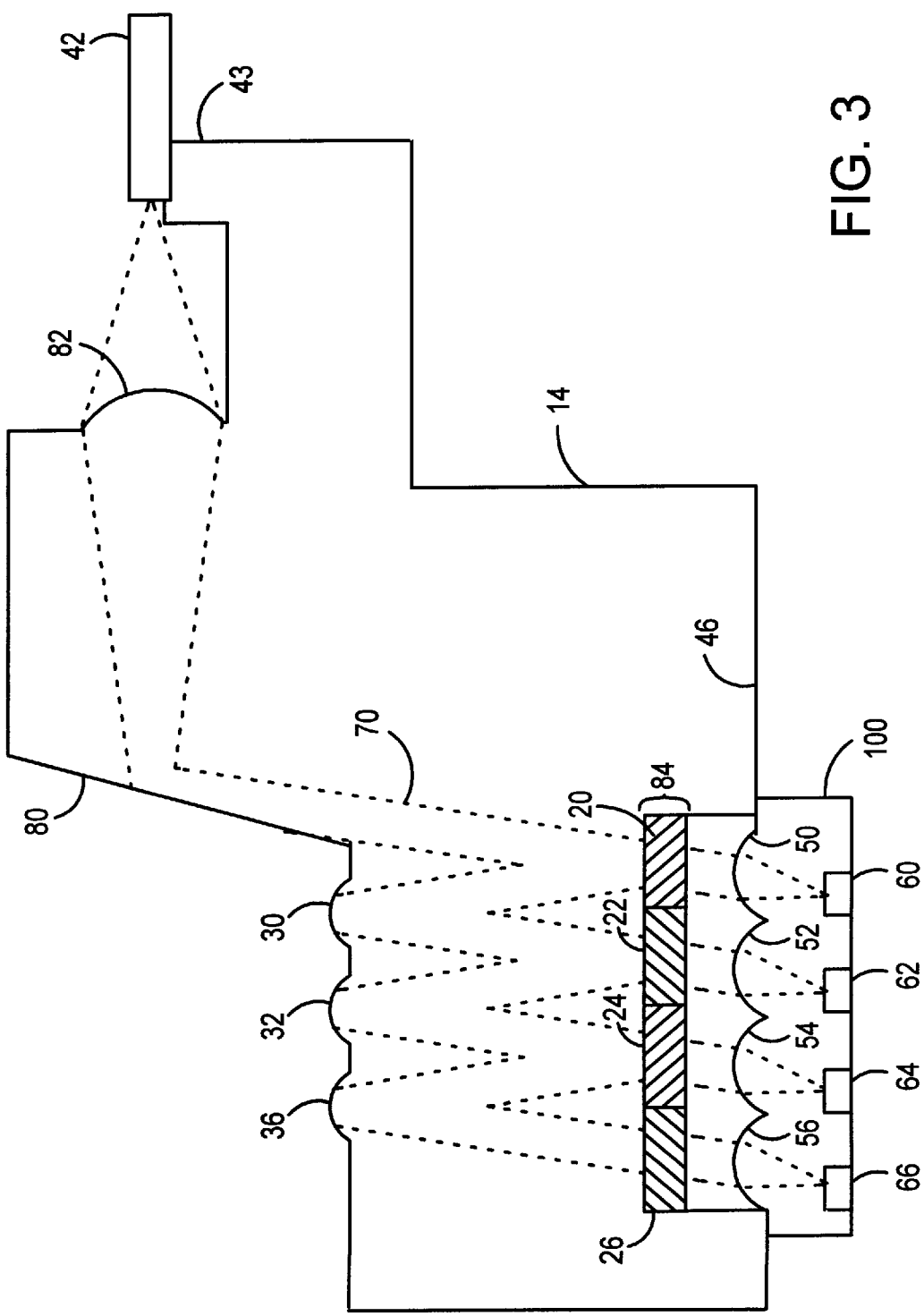
Fig. 3 is a depiction of a four-channel demultiplexer with an objective lens, an integrated filter array, and a detector array with an integrated lens array in accordance with the invention.

FIG. 3 is another alternative input arrangement in which like elements are numbered as in FIGS. 1 and 2. In the arrangement of FIG. 3, the input surface is an objective lens 82 that is integrated into the surface of the MOB 14. The objective lens is preferably an aspheric convex surface that is shaped such that the light that reaches the first interference filter 20 has the desired spatial and angular characteristics. Because the light is being focused by the objective lens, a flat integrated mirror 80 can be utilized to direct the light from the objective lens to the first filter. Alternatively, the objective lens can be arranged such that the light propagates directly from the objective lens to the first filter. As with FIGS. 1 and 2, mechanical features 43 can be formed in the MOB to register and align the optical fiber 42 with the input surface of the MOB.

Referring back to FIG. 1, the output end 46 of the MOB 14 preferably includes a flat output surface. The interference filters 20–26 are preferably attached to or deposited on the flat output surface. As an alternative, mechanical features can be integrated into the output end of the MOB to aid in the alignment and registration of the interference filters. For example, FIG. 2 depicts a design in which depressions are formed in the output end 46 of the MOB to precisely position the four distinct interference filters 20–26. FIG. 3 depicts another alternative design in which a single depression is formed in the output end 46 to receive an integrated filter array 84.

In some embodiments, the interference filters can be deposited directly onto the output end 46 of the MOB 14. When the filters are deposited directly onto the output end of the MOB, the output surfaces do not have to be flat. For example, curved output surfaces formed at the output end of the MOB may be used to maintain the desired beam characteristics within the MOB and to focus the beams of light that are output from the MOB. Although some examples of the output end arrangement are shown and described, the exact arrangement is not critical to the invention and may be modified as would be apparent to one of ordinary skill in the art.

Referring back to FIG. 1, the interference filters 20–26 are preferably dielectric filters that are used to separate one optical wavelength from another. The wavelength-selective filters are discrete pieces that are preferably arranged in a linear array with fixed center-to-center spacing. The interface of the interference filters and the output end 46 of the MOB 14 defines a mirror plane. Each filter has high transmission and low reflection over a selected set or sets of wavelengths, called the passband, and low transmission and high reflection over another set or sets of wavelengths, called the stopband. The preferable transmission spectrum for WDM demultiplexer applications is a "flat-top" shape in which very high and uniform transmission is achieved over the passband wavelength interval, while immediately outside the passband very low transmission and high reflection is achieved. The wavelength interval over which the transmission varies from high to low should be as small as possible to accommodate narrow channel spacing. In a preferred four-channel WDM system, the four channels are centered at approximately 1280, 1300, 1320, and 1340 nanometers (nm). Another preferred four-channel spacing distribution includes wavelengths of 820, 835, 850, and 865 nm. Although the demultiplexer is described with reference to a four-channel demultiplexer, more or fewer channels can be demultiplexed by adding or subtracting filters and relay mirrors.

Because the transmission spectrum of an interference filter changes as a function of the angle of incidence, the best performance is achieved when the angular extent of the light passing through a filter is minimized. In addition, the use of materials with high refractive indices will reduce the dependence of the transmission spectrum on the incident angle. Although the interference filters 20–26 are separated into discrete pieces in FIGS. 1 and 2, in the demultiplexer of FIG. 3, the four interference filters 20–26 are monolithically integrated onto a single substrate to form a filter array 84 that is attached to the output surface of the MOB. Either arrangement can be implemented in accordance with the invention. In another alternative embodiment, the interference filters can be deposited directly onto the output end of the MOB.

The relay mirrors 30–36 in FIGS. 1, 2, and 3 are converging or focusing mirrors that are preferably integrated into a surface of the MOB 14 that is parallel to the faces of the interference filters 20–26. The relay mirrors are located and shaped to produce the desired spatial and angular characteristics of a beam that propagates in a zigzag fashion between the interference filters and the relay mirrors. The relay mirrors are preferably convex aspheric surfaces that are coated so that they are internally reflective. The relay mirrors may also be diffractive mirrors or any other mirror that causes an increase in the angle of convergence or a decrease in the angle of divergence of a beam of light.

In the ideal limit, where the fiber core and the beam diameter at the filters can be treated as points, much smaller than any other dimension in an optical system, an ellipsoidal objective mirror and ellipsoidal relay mirrors with foci at the fiber and the filter centers can be utilized to provide more precise imaging. The objectives should be chosen such that the ratio of image-to-object distances gives the angular reduction factor necessary to achieve satisfactory filter transmission spectra. However, when space limitations dictate small dimensions for the MOB, this ideal limit is a poor approximation to the system. In this case, the surface profiles of the objective mirror or lens and the relay mirrors should be optimized with a more general aspheric surface to produce beams with sufficiently small angular and beam diameter at the filters.

Referring to FIG. 1, in an additional aspect of the invention, an array of lenses 50, 52, 54, and 56 is coupled to the output end 46 of the MOB 14 to direct and focus the filtered light to the adjacent array of detectors 60, 62, 64, and 66, or alternatively to other output devices, such as optical fibers. In the arrangement of FIG. 1, the lenses 50–56 are integrated into a lens array block 76. The lens array block is preferably a structure of plastic or glass similar to the MOB. The lens array block and the MOB can be made to have complementary mechanical features 72, 74 and 92, 94 that enable the two parts to fit together with precise alignment. In the design of FIG. 1, the lens array block and the MOB are fit together and secured with adhesive. In an alternative to the two-part design of FIG. 1, a lens array can be integrated into the MOB, with the MOB having a slot where the interference filters are inserted between the output end of the MOB and the lens array. In either case, mechanical features 96 and 98 of the lens array block and/or the MOB can be formed to act as spacers that fix the distance between the lenses and the detectors.

The lenses 50–56 integrated into the lens array block 76 are preferably either piano-convex or bi-convex aspheres. The piano-convex aspheres have the advantage that the planar sides can face the interference filters 20–26 with index-matching adhesive filling in the intervening space to reduce loss due to Fresnel reflection. The convex side of the lenses can face the detectors 60–66, with the mechanical features 96 and 98 fixing the distance between the lenses and the detectors. Referring to FIG. 3, in another embodiment lenses 50–56 are integrated into the substrate side of a substrate-illuminated detector array 100. In the case of FIG. 3, a roughly spherical convex surface is etched into the detector array substrate and the substrate thickness sets the lens-to-detector distance. Diffractive lenses can also be used for focusing an output beam and an array of diffractive lenses can be integrated into the detector substrate, the MOB, or a separate lens part.

Referring to FIG. 2, in another alternative embodiment, light 110, 112, 114, and 116 output from the interference filters 20–26 propagates directly to the detectors 60–66. In order to implement direct coupling, the detector array 100 is preferably closely aligned with the filters and the spatial extent of the beam incident on the filters is sufficiently smaller than the detector diameter to allow for alignment tolerances and divergence between the filters and the detectors. Direct coupling sets a lower bound on the angular divergence of the beam that is incident on the interference filter.

As stated above, the light output from the interference filters 20–26 can be directed into optical fibers, instead of detectors. When outputting into optical fibers, the fiber core diameter and numerical aperture define limitations regarding the spatial and angular extent of the output beam. Mechanical features on the MOB and/or the lens array block can be formed to align and register the output fibers.

Although the MOB 14 is described with reference to a WDM demultiplexer, the MOB can be slightly modified and operated in reverse as a WDM multiplexer. When used as a WDM multiplexer, single-wavelength beams of light are input to the MOB behind the interference filters 20–26. The interference filters pass the input wavelengths and reflect other wavelengths within the MOB. The combined light is then reflected by the objective mirror 40 into the optical fiber 42, which acts as an output fiber.

What is claimed:

1. An optical demultiplexer comprising:
   a body;
   a plurality of wavelength-specific filters connected to an output region of said body;
   input means, integrated into said body, for directing a beam of optical energy that includes multiple wavelengths toward a first one of said wavelength-specific filters; and
   a relay arrangement of reflective focusing lenses configured to recurringly converge said beam and to redirect said beam to said wavelength-specific filters, said reflective focusing lenses being integrally formed into said body and being positioned relative to said wavelength-specific filters such that beam convergence occurs with approach to each said wavelength-specific filter and such that at least a portion of said beam impinges multiple wavelength-specific filters and reflective focusing lenses.

2. The optical demultiplexer of claim 1 further including a plurality of collectors connected at said output region of said body in a one-to-one correspondence with said plurality of wavelength-specific filters, each said collector being positioned to receive optical energy that has passed through a corresponding one of said wavelength-specific filters.

3. The optical demultiplexer of claim 1 wherein said input means includes a reflector formed by a surface variation of said body and positioned to receive said beam and to direct and focus said beam toward said first one of said wavelength-specific filters.

4. The optical demultiplexer of claim 3 wherein said wavelength-specific filters transmit optical energy within one wavelength range and reflect optical energy within other wavelength ranges.

5. The optical demultiplexer of claim 1 wherein said reflective focusing lenses are concave aspherical mirrors formed in a linear array on a surface of said body.

6. The optical demultiplexer of claim 5 wherein said plurality of mirrors have reflective surfaces oriented to reflect beams of optical energy toward said plurality of filters such that said beams contact said filters at the same angle of incidence.

7. The optical demultiplexer of claim 1 wherein said reflective focusing lenses are ellipsoidal mirrors formed by surface variations along said body.

8. An optical demultiplexer comprising:

a main optical block having an input region for receiving a beam of multi-wavelength optical energy and a plurality of outputs for outputting a plurality of wavelength-specific optical energy beams;

a plurality of wavelength-specific filters aligned with said plurality of outputs and connected to said main optical block such that a first of said filters is impinged by said received beam of multi-wavelength optical energy, each of said wavelength-specific filters having optical characteristics that cause transmission of optical energy at a first set of wavelengths and reflection of optical energy at a second set of wavelengths outside of said first set; and a plurality of converging reflectors formed at a surface of said main optical block, each said converging reflector being configured to focus light reflected therefrom, said converging reflectors being located relative to said wavelength-specific filters such that each converging reflector receives at least a portion of said beam of optical energy from one of said wavelength-specific filters and redirects said received optical energy into a converging non-collimated beam toward a different one of said wavelength-specific filters.

9. The optical demultiplexer of claim 8 further comprising an input reflector located relative to said input such that said beam of multi-wavelength optical energy is reflected from said input reflector to said first of said wavelength-specific filters.

10. The optical demultiplexer of claim 9 wherein said input reflector is a concave reflector that focuses said beam from said input reflector to said first of said wavelength-specific filters.

11. The optical demultiplexer of claim 9 wherein said input reflector is an ellipsoidal reflector with a first focus point at said input and a second focus point at said first of said plurality of wavelength-specific filters.

12. The optical demultiplexer of claim 9 wherein said input reflector is formed at said surface of said main optical block, said main optical block being a unitary injection molded plastic body that includes said input reflector and said converging reflectors.

13. The optical demultiplexer of claim 8 wherein said main optical block is coupled to a lens array that receives said wavelength-specific optical energy beams from said plurality of outputs and that directs and focuses said wavelength-specific optical energy beams to collectors.

14. The optical demultiplexer of claim 13 wherein said collectors are optical fibers.

15. The optical demultiplexer of claim 13 wherein said collectors are optical detectors.

16. The optical demultiplexer of claim 8 wherein said converging reflectors are concave aspherical mirrors.

17. The optical demultiplexer of claim 8 wherein said converging reflectors are diffractive mirrors.

18. The optical demultiplexer of claim 8 wherein said input is a lens formed at said surface of said main optical block such that said beam of multi-wavelength optical energy undergoes focusing upon entering said main optical block, said main optical block being an injection molded plastic piece.

19. An optical demultiplexer comprising:

a monolithic main optical block having an input for receiving a non-collimated beam of multi-wavelength optical energy;

a plurality of wavelength-selective filters connected to said monolithic main optical block, each said filter passing non-collimated light within a first set of wavelengths and reflecting non-collimated light with a second set of wavelengths;

means, integrated as a first region of said main optical block, for focusing said received non-collimated beam and for directing said received non-collimated beam to a first filter of said plurality of wavelength-selective filters; and a plurality of focusing reflectors integrated as a second region of said main optical block such that at least a portion of said non-collimated beam is reflected and focused to each one of said filters, said non-collimated beam of multi-wavelength optical energy thereby being separated by said plurality of wavelength-selective filters into a plurality of wavelength-specific optical energy beams.

20. The optical demultiplexer of claim 19 wherein:

said plurality of focusing reflectors are located in general alignment along a first plane;

said plurality of wavelength-selective filters are located in general alignment along a second plane; and said first plane of said focusing reflectors is parallel to said second plane of said wavelength-selective mirrors.

* * * * *